(12) United States Patent
Haines

(10) Patent No.: US 9,298,709 B2
(45) Date of Patent: Mar. 29, 2016

(54) COMPUTER SYSTEM TO VISUALIZE DATA FROM AN IP RIGHTS DATABASE

(75) Inventor: Thomas Haines, West Leederville (AU)

(73) Assignee: Practice Insight PTY LTD, West Leederville (AU)

( * ) Notice: Subject to any disclaimer, the term of this patent is extended or adjusted under 35 U.S.C. 154(b) by 97 days.

(21) Appl. No.: 14/239,106

(22) PCT Filed: Aug. 17, 2012

(86) PCT No.: PCT/AU2012/000971
§ 371 (c)(1),
(2), (4) Date: Feb. 14, 2014

(87) PCT Pub. No.: WO2013/023252
PCT Pub. Date: Feb. 21, 2013

(65) Prior Publication Data
US 2014/0176557 A1    Jun. 26, 2014

(30) Foreign Application Priority Data
Aug. 18, 2011 (AU) ................................. 2011903310

(51) Int. Cl.
*G06F 17/30* (2006.01)
*G06T 11/20* (2006.01)
*G06Q 30/02* (2012.01)
*G09B 29/00* (2006.01)

(52) U.S. Cl.
CPC ...... *G06F 17/30011* (2013.01); *G06Q 30/0205* (2013.01); *G06T 11/206* (2013.01); *G09B 29/006* (2013.01)

(58) Field of Classification Search
CPC ... G06T 11/206; G06F 3/0481; G06F 17/246; H04L 12/2458; G06Q 10/10
See application file for complete search history.

(56) References Cited

U.S. PATENT DOCUMENTS

| | | | |
|---|---|---|---|
| 6,934,634 B1 | 8/2005 | Ge | 702/2 |
| 2004/0117358 A1 | 6/2004 | von Kaenel et al. | 707/3 |
| 2004/0123245 A1 | 6/2004 | Bianchi et al. | 715/526 |
| 2004/0230604 A1* | 11/2004 | Getzoff et al. | 707/102 |
| 2005/0004945 A1 | 1/2005 | Cossins et al. | 77/104.1 |
| 2010/0098342 A1 | 4/2010 | Davis et al. | 382/220 |
| 2010/0114854 A1 | 5/2010 | Lee | 707/707 |

OTHER PUBLICATIONS

International Search Report mailed Nov. 9, 2012, issued in corresponding International Application No. PCT/AU2012/000971.

* cited by examiner

*Primary Examiner* — Todd Buttram
(74) *Attorney, Agent, or Firm* — Stein IP, LLC

(57) ABSTRACT

A system (10) to visualize data from an IP rights database as a geographic map having a viewable area. A map display change monitor (23) receives a map change message in relation to a change in the viewable area of the geographic map and generates a display change notification, which includes the geographic coordinates of the current viewable area of the geographic map. An IP rights generator (37) generates a list of IP rights from the IP rights database, in which the geographic address of at least one owner of each IP right is within the geographic area defined by the current map coordinates and also restricts the list of IP rights based on one or more restriction criteria related to the IP rights to form a restricted list of IP rights. An information display generator (26) generates and displays one or more data visualizations derived from the restricted list of IP rights and updates data visualizations upon receiving each successive display change notification.

17 Claims, 8 Drawing Sheets

Restriction Criteria Interface

Fig. 6

| | |
|---|---|
| IP jurisdiction of the IP rights : | ☑ CN  ☐ US  ☐ KR |
| | ☐ EP  ☑ JP  ☐ AU |
| Type of IP Right : | ☑ Trademarks |
| | ☐ Designs |
| | ☐ Patents |
| Time Period : | [ Last 3 years ⇅ ]  ( Set exact dates. ) |
| IP right owner: | [ Corporation ⇅ ] |
| Technology Type: | ☐ Agricultural         ☐ Mechanical Engineering |
| | ☐ Biotechnology        ☑ Mineral Processing |
| | ☐ Electrical & Computing  ☐ Pharmaceutical |
| | ☐ Transport |
| | ( More ) |
| Industrial Type: | ☐ Aeronautic     ☐ Health |
| | ☐ Automotive     ☐ Marine |
| | ☐ Commerce       ☐ Manufacturing |
| | ☑ Electronics    ☐ Mining |
| | ☑ Telcomunications |
| Number of Applications: | 1 ————●———————— 50 |
| Representative listed: | ☐ Yes |
| | ☐ No |
| | ☑ Both |
| Patented IPC classes: | [ SECTION C – CHEMISTRY METALLURGY ▼ ] |
| Number of classes in TM Application | ●————●————————— 45 (20) |

TM Classes:

| | | | | | |
|---|---|---|---|---|---|
| ☐ 1 | ☐ 2 | ☐ 3 | ☐ 4 | ☐ 5 | |
| ☐ 6 | ☐ 7 | ☐ 8 | ☑ 9 | ☐ 10 | |
| ☐ 11 | ☐ 12 | ☐ 13 | ☐ 14 | ☐ 15 | |
| ☐ 16 | ☐ 17 | ☐ 18 | ☐ 19 | ☐ 20 | |
| ☐ 21 | ☐ 22 | ☐ 23 | ☐ 24 | ☐ 25 | |
| ☐ 26 | ☐ 27 | ☐ 28 | ☐ 29 | ☐ 30 | |
| ☐ 31 | ☐ 32 | ☐ 33 | ☐ 34 | ☐ 35 | |
| ☐ 36 | ☐ 37 | ☐ 38 | ☐ 39 | ☐ 40 | |
| ☐ 41 | ☑ 42 | ☐ 43 | ☐ 44 | ☐ 45 | |

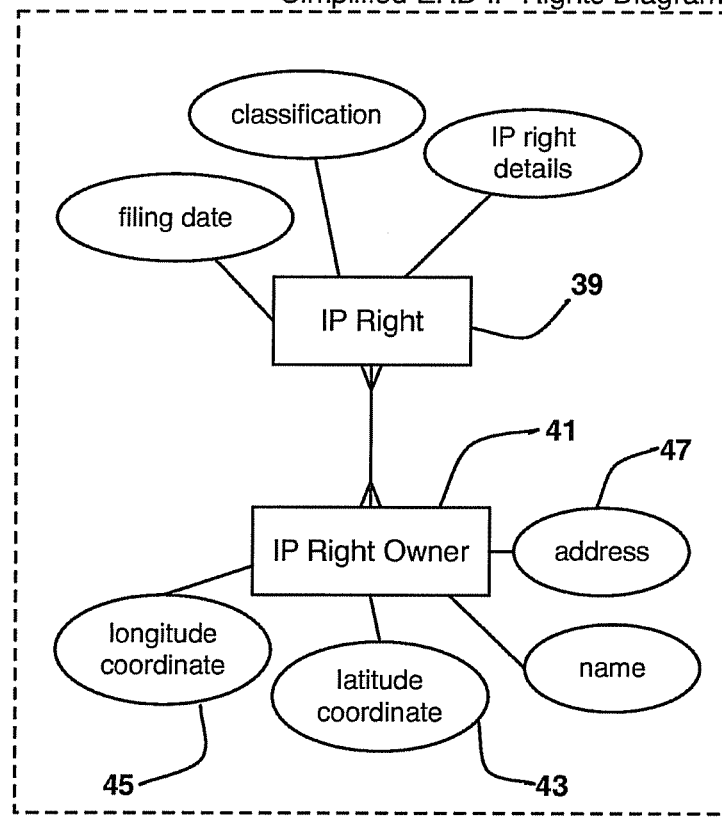

COMPUTER SYSTEM TO VISUALIZE DATA FROM AN IP RIGHTS DATABASE

CROSS-REFERENCE TO RELATED APPLICATIONS

This application is a national phase of International Application No. PCT/AU2012/000971, filed Aug. 17, 2012, which claims the benefit of Australian Application No. 2011903310, filed Aug. 18, 2011, in the Australian Patent Office. All disclosures of the

BACKGROUND OF THE INVENTION

1. Technical Field

The present invention relates to computer systems. More particularly, the present invention relates to data visualization of commercial, industry and/or economic activity based on intellectual property data using a spatial interface.

A reference herein to "IP" means "intellectual property".

A reference herein to "IP" includes each type of IP that may be applied for, by at least one applicant, to an administrative body. By way of example only, three types of such IP include patents, trademarks and designs.

A reference herein to an "IP right" includes a reference to an application for an IP right ("IP application") and, or alternatively, to an IP right that has been granted, issued, registered or otherwise bestowed ("IP grant").

Throughout this specification, unless the context requires otherwise, the word "comprise" and variations such as "comprises", "comprising" and "comprised" are to be understood to imply the presence of a stated integer or group of integers but not the exclusion of any other integer or group of integers.

Throughout this specification, unless the context requires otherwise, the word "include" and variations such as "includes", "including" and "included" are to be understood to imply the presence of a stated integer or group of integers but not the exclusion of any other integer or group of integers.

2. Description of the Related Art

The discussion of the background art, any reference to a document and any reference to information that is known, which is contained in this specification, is provided only for the purpose of facilitating an understanding of the background art to the present invention, and is not an acknowledgement or admission that any of that material forms part of the common general knowledge in Australia or any other country as at the priority date of the application in relation to which this specification has been filed.

Various examples correlating a viewable map with other location data such as event or object locations are known or have been described, where the location of an object or event is displayed as a point or position on a map. An example of this is seen in Google Maps where it is possible to search for restaurants within an area denoted by a displayed map. The restaurants will be shown as a marker that has the appearance of a drop pin. In this arrangement, the viewable map may be moved or scaled, and as the displayed geographical area in the viewable map changes, any new restaurants that come within the changed viewable map area will appear (and restaurants that are no longer within the displayed map area will be no longer shown).

In addition to this, following the earthquakes of 2010 in Christchurch, New Zealand, a website was created known as Canterbury Quake Live which may be accessed at http://quake.crowe.co.nz/. This website featured data gathered in connection with earthquakes. One feature of this website displayed the location of epicenters of earthquakes on a map of Canterbury, New Zealand. Another feature of this website displayed a list of earthquakes with magnitude information, depth and approximate address in one pane, and in another pane, a viewable map was displayed where the location of an earthquake event selected from the list was shown as a marker.

In the field of intellectual property, there are many tools available that allow a user to search for a list of intellectual property rights documents based on various search criteria. However, when dealing with extremely large lists of documents numbering in the thousands or tens of thousands, the ability of a reader to expediently digest and understand their meaning and implications is limited. Whilst technology has become extremely efficient at storing and recording large volumes of data, the ability to interpret and/or extrapolate these volumes of data has not developed at a commensurate rate.

In the correlation of intellectual property rights with a viewable map, U.S. Pat. No. 7,756,848 (GETZOFF) discloses a system that, for a given trademark name and filing date, related cases from a database system are displayed in the form of markers on a viewable map, to show where that trademark was filed. It is also disclosed that the color of the pins could denote the status of the trademark application, or a client's different subsidiaries could be displayed in different colors. Whilst this provides a visual presentation of where a given trademark or list of trademarks of a client has been filed or is registered, it does not provide any understanding of the geographic areas per se.

SUMMARY OF THE INVENTION

This invention seeks to provide an alternative arrangement for querying an intellectual property database, where a viewable map may serve as a graphical interface acting as a filter for searching intellectual property data, in addition to other filters including textual or classified data.

Such an arrangement could be useful in overcoming a difficulty in understanding which industries are active, located within a geographical area, and assist in understanding where opportunities might exist to engage in a commercial or industrial activity.

In a computer system that presents a map interface to a user, the invention enables a user, among other things, to use the map interface as the means to select a segment of IP rights that are to be browsed or analyzed, and thus be able to understand macro information associated with IP rights, for those IP rights that have been filed by IP owners that correspond with the user-selected geographic area. A map display change monitor, provided in conjunction with a map display interface, provides a fluid mechanism whereby the segment of the database of IP rights that are under examination can be manipulated by panning, scrolling or zooming the viewable area of a map, and where a display pane of the requested information can be updated immediately following the user's movement of the map, or at the user's election to update the display pane. That is, the map display change monitor may receive an update command from the user, and whereby the display pane of the requested information is updated in turn.

By including a restriction criteria interface, the invention enables the user to further refine or filter the segment of the database of the IP rights under examination, to restrict the information displayed in the display pane according to the restriction criteria. This allows the user to focus on deriving information from, for example, only recently filed IP rights, and/or patent applications for new inventions, particular technologies, and/or particular applicants, particular goods and services within trademark applications, and so on. As two further examples, a user may be interested only in trademarks filed where clothing goods in class 25 have been nominated, or only in patent applications filed concerning pharmaceutical substance subject matter.

There are many applications of the present invention. For example, a provider of legal services may be interested to know what types of industries are active over a recent time period in a given area, in terms of planning for the provision of IP and other legal services to meet the needs of the business community residing within that given geographical area. Other companies providing for the business community, such as suppliers of other goods and services, may also wish to understand what trends are reflected by the filing of IP rights in given industries within a geographical area. The owners of IP rights may benefit from knowing whether there are any other parties in their area, or any area of interest, that are developing technology in a similar technological field, with a view to possible collaboration opportunities or other purposes.

Thus, the user may understand and synthesize meaningful macro information inferred from the filing of defined intellectual property rights by owners in a given geographical area; and the adoption of data visualization techniques allow the information to be readily understood by the user of the information.

DISCLOSURE OF INVENTION

In accordance with one aspect of the present invention, there is provided a data processing system to visualize data from an IP rights database comprising:

a geographic map display interface to display a geographic map having a viewable area;

a map display change monitor to:

receive and store at least the recent geographic co-ordinates of the viewable area of the geographic map, compare the current geographic co-ordinates with immediate previously stored geographic co-ordinates, and generate a display change notification when the current geographic co-ordinates do not match immediate previously stored geographic co-ordinates;

a restriction criteria interface to ascertain one or more restriction criteria related to the IP rights;

an IP rights list generator to generate a list of IP rights, from the database of IP rights, in which the geographic address of at least one owner of each IP right is within the geographic area defined by the geographic co-ordinates of the current viewable area of the geographic map, and restrict the list of IP rights based on one or more restriction criteria related to the IP rights to form a restricted list of IP rights; and an information display generator to generate and display an information pane containing one or more data visualizations derived from the restricted list of IP rights;

wherein, in use, upon receiving each successive display change notification, the information display generator generates or updates each data visualization displayed in the information pane.

In this aspect of the invention, only current and immediately previous geographic co-ordinates need to be stored in order to effect the invention, but if a user history of use of the system is required, the system may allow for storage of geographic co-ordinates for an entire session or multiple sessions.

In accordance with a second aspect of the present invention, there is provided a computer system to visualize data from an IP rights database comprising:

a geographic map display interface to display a geographic map having a viewable area;

a map display change monitor to:

receive a map change message in relation to a change in the viewable area of the geographic map, obtain the geographic co-ordinates of the current viewable area of the geographic map, and generate a display change notification including the geographic co-ordinates of the current viewable area of the geographic map;

a restriction criteria interface to ascertain one or more restriction criteria related to the IP rights;

an IP rights list generator to generate a list of IP rights, from the database of IP rights, in which the geographic address of at least one owner of each IP right is within the geographic area defined by the geographic co-ordinates of the current viewable area of the geographic map, and restrict the list of IP rights based on one or more restriction criteria related to the IP rights to form a restricted list of IP rights; and an information display generator to generate and display an information pane containing one or more data visualizations derived from the restricted list of IP rights;

wherein, in use, upon receiving each successive display change notification, the information display generator generates or updates each data visualization displayed in the information pane based on the geographic co-ordinates of the current viewable area of the geographic map display corresponding to each successive display change notification.

In accordance with a preferred feature of either aspect of the present invention, the computer system further comprises a data visualization selector to allow the user to select one or more data visualizations based on the restriction criteria.

Preferably, the one or more restriction criteria comprises a default setting of restriction criteria, or one or more user-selectable restriction criteria.

Preferably, the one or more data visualizations comprise a default setting of data visualizations based on a default setting of the restriction criteria, or user-selectable data visualizations based on the restriction criteria.

Preferably, the restriction criteria include at least one criterion from the following group: IP jurisdiction of the IP rights; type of IP right; technology type; industry type; filing date of the IP right; the number of applications for IP rights that an IP right owner has filed; whether the IP right owner is an individual or a corporation; whether a representative is listed for the IP right; patent IP rights that are classified in one or more defined IPC classes; trademark IP rights that are classified in a given number of classes; and trademark IP rights classified in one or more defined classes.

Preferably, the data visualizations include at least one data visualization from the following group: a chart of the types of technology to which the IP rights relate; a chart of the types of industries to which the IP rights relate; a filing trend analysis chart for the IP rights; an IP rights owner filing size chart.

In accordance with another aspect of the present invention there is provided a process for visualizing data from an IP rights database comprising:

receiving a map change message in relation to a change in the viewable area of the geographic map, obtaining the geographic co-ordinates of the current viewable area of the geographic map display, generating a list of IP rights, from the database, in which the geographic address of at least one owner of each IP right is within the geographic area defined by the geographic co-ordinates of the current viewable area of the geographic map display, restricting the list of IP rights based on one or more restriction criteria related to the IP rights to form a restricted list of IP rights, generating and displaying an information pane containing one or more data visualizations related to the restricted list of IP rights, and generating or updating each data visualization displayed in the information pane based on each set of successively obtained geographic co-ordinates of the current viewable area of the geographic map display.

In accordance with a further aspect of the present invention there is provided a process for visualizing data from an IP rights database comprising:

monitoring and storing at least the recent geographic co-ordinates of a viewable area of a geographic map and issuing a display change notification on detecting a change in the viewable area of the geographic map, generating a list of IP rights, from the database, in which the geographic address of at least one owner of each IP right is within the geographic area defined by the geographic co-ordinates of the current viewable area of the geographic map display, restricting the list of IP rights based on one or more restriction criteria related to the IP rights to form a restricted list of IP rights, generating and displaying an information pane containing one or more data visualizations related to the restricted list of IP rights, and generating or updating each data visualization displayed in the information pane based on each set of successively obtained geographic co-ordinates of the current viewable area of the geographic map display.

In accordance with a preferred feature of either aspect of the process, the one or more restriction criteria comprises a default setting of one or more restriction criteria, or one or more user-selectable restriction criteria.

Preferably, the one or more data visualizations comprise a default setting of data visualizations based on a default setting of the restriction criteria, or user-selectable data visualizations based on the restriction criteria.

Preferably, the restriction criteria include at least one criterion from the following group: IP jurisdiction of the IP rights; type of IP right; technology type; industry type; filing date of the IP right; the number of applications for IP rights that an IP right owner has filed or owns; whether the IP right owner is an individual or a corporation; whether a representative is listed for the IP right; patent IP rights that are classified in one or more defined IPC classes; trademark IP rights that are classified in a given number of classes; and trademark IP rights classified in one or more defined classes.

Preferably, the data visualizations include at least one data visualization from the following group: a chart of the types of technology to which the IP rights relate; a chart of the types of industries to which the IP rights relate; a filing trend analysis chart for the IP rights; an IP rights owner filing size chart; and, a list of IP rights owners.

In one embodiment, the display change notification is generated after a predefined time period elapses and there has been no change in the viewable area of the geographic map.

In an alternative embodiment, the display change notification is generated following a user initiated command. A user command activator may be provided for this purpose. The user command activator may be an on screen button.

Additional aspects and/or advantages of the invention will be set forth in part in the description which follows and, in part, will be obvious from the description, or may be learned by practice of the invention.

BRIEF DESCRIPTION OF THE DRAWINGS

The present invention will now be described, by way of example only, with reference to the accompanying drawings, in which:

FIG. 6 illustrates a sample restriction criteria interface in accordance with certain implementations of the present invention.

FIG. 7 illustrates a sample data visualization selector in accordance with certain implementations of the present invention.

FIG. 8 is an entity relationship diagram that illustrates the relationship between an IP Right entity and an IP Right Owner entity in accordance with certain implementations of the present invention.

DETAILED DESCRIPTION OF THE EMBODIMENTS

To provide the most widely-accessible service as possible, a web server/client architecture is chosen for the present embodiment.

Figure 3:
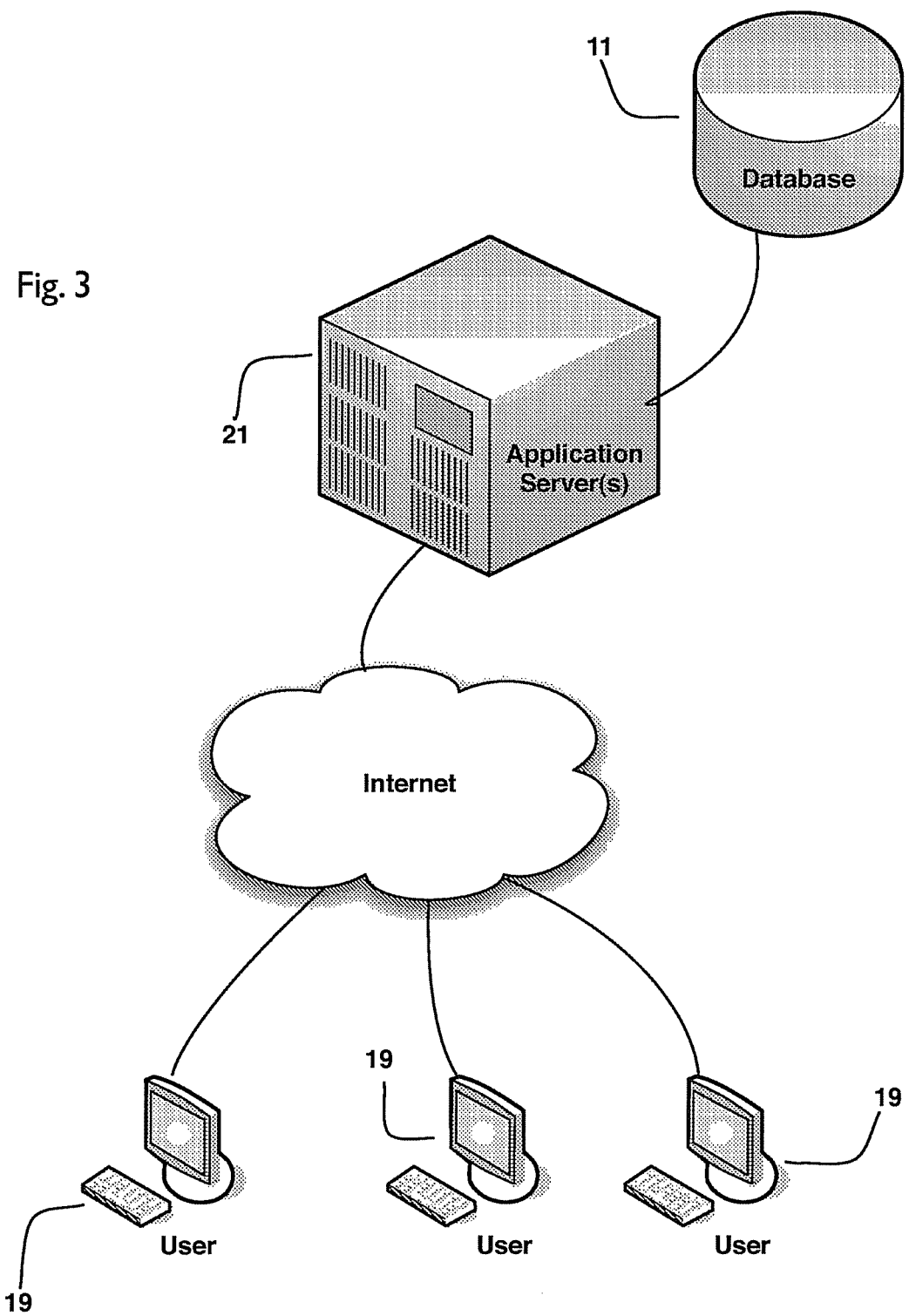
FIG. 3 is an overview of an environment in which the present invention may be implemented.

With reference to FIG. 3, an overview of the environment of the present embodiment whereby a plurality of users 19 are connected to one or more web application servers 21 via the Internet. The Internet could alternatively be a local area network.

By implementing the present invention using a web server/client architecture, a minimal amount of software and configuration is required of the user (i.e. a modern computer or tablet computer that is connected to the Internet is all that is required). That is, the user 19 can access the system 10 using a standard web browser. More than one web application server 21 could be also added in conjunction with a load-balancer, if a large number of users 19 are using the system.

A further advantage of using a server/client architecture is that the database and software logic can be maintained and updated at one place, rather than requiring each change or update to be reflected in the configuration or installation of the user's device.

In the present embodiment, a web application server 21 in the form of the Java-based Apache Tomcat web application server is utilized. However, any suitable for purpose web application server 21 could be used. As the present embodiment is implemented on the Java™ platform, the remainder of this specification refers to terminology that is appropriate with respect to any object-orientated systems methodology. Those skilled in the art would appreciate that alternative programming languages or scripts could be used, such as the .Net™ framework or a procedural language such as PHP.

In the present embodiment, database of IP rights 11 is provided in the form of a relational SQL database, which stores information that is interrogated by a user 19. The database of IP rights 11 may be in the form of Microsoft™ SQL Server or MySQL. Any suitable database that can store and retrieve data relating to IP rights 11 can be adopted.

Figure 1:
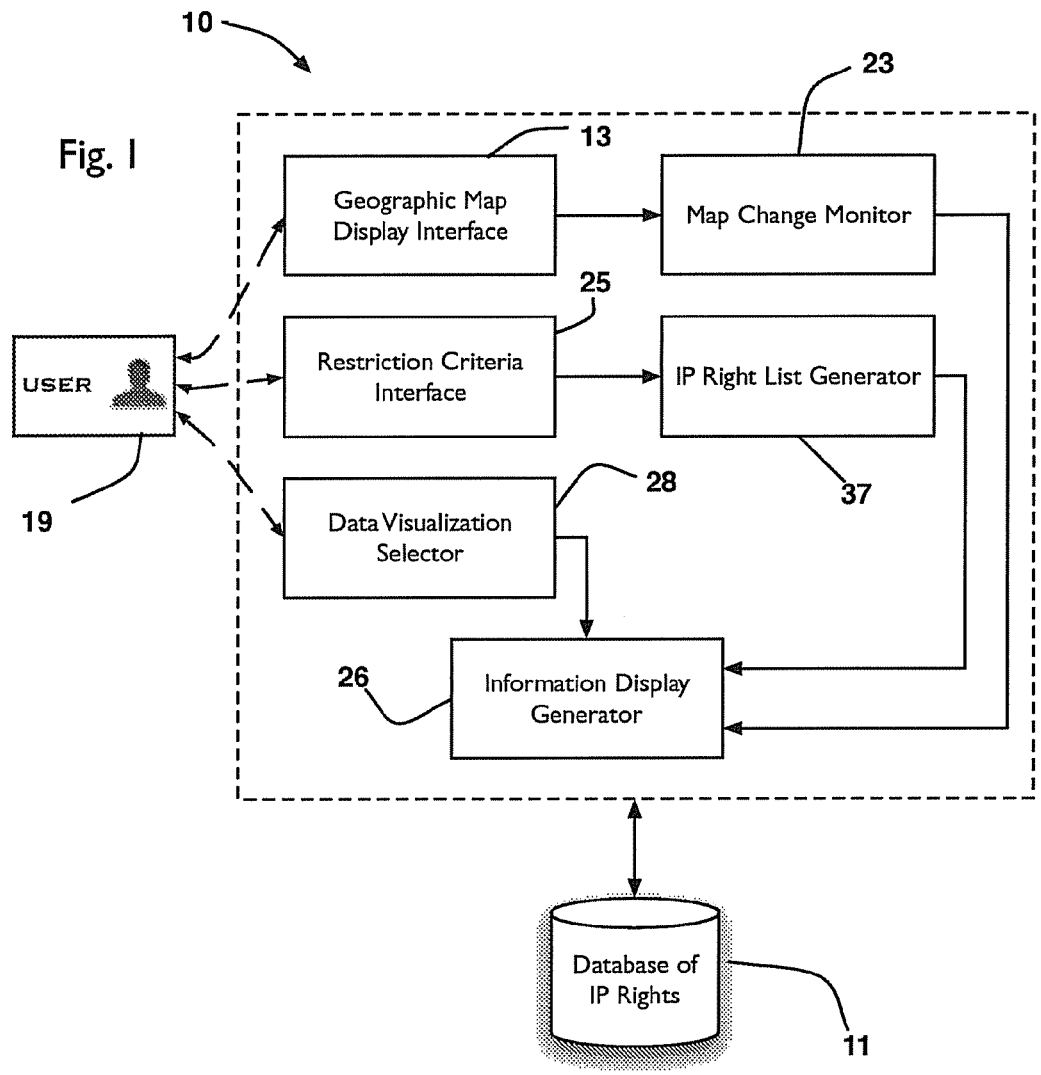
FIG. 1 is a computer system to visualize data from an IP rights database according to one aspect of the present invention.
Figure 2:
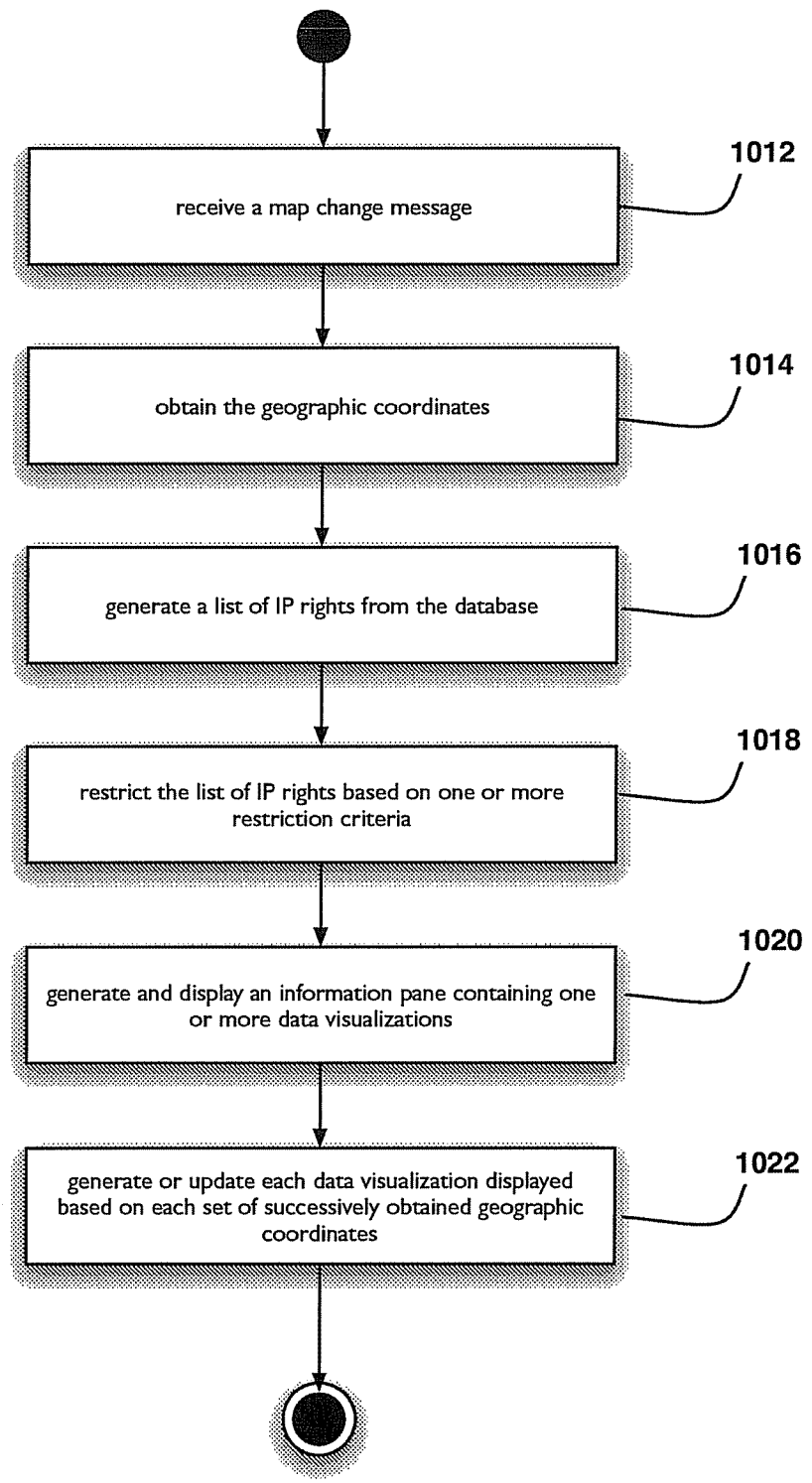
FIG. 2 is flowchart diagram of a process for visualizing data from an IP rights database according to another aspect of the present invention.

With reference to FIG. 1, a computer system to visualize data from an IP rights database 11 is provided, having a geographic map display interface 13 to display a geographic map having a viewable area. The geographic map display interface 13 can be panned or scrolled by moving a mouse over the geographic map when the button is pressed, or by dragging one's finger up/down/across when using a touch screen. The geographic map display interface 13 may also include a zoom controller 17.

Figure 4:
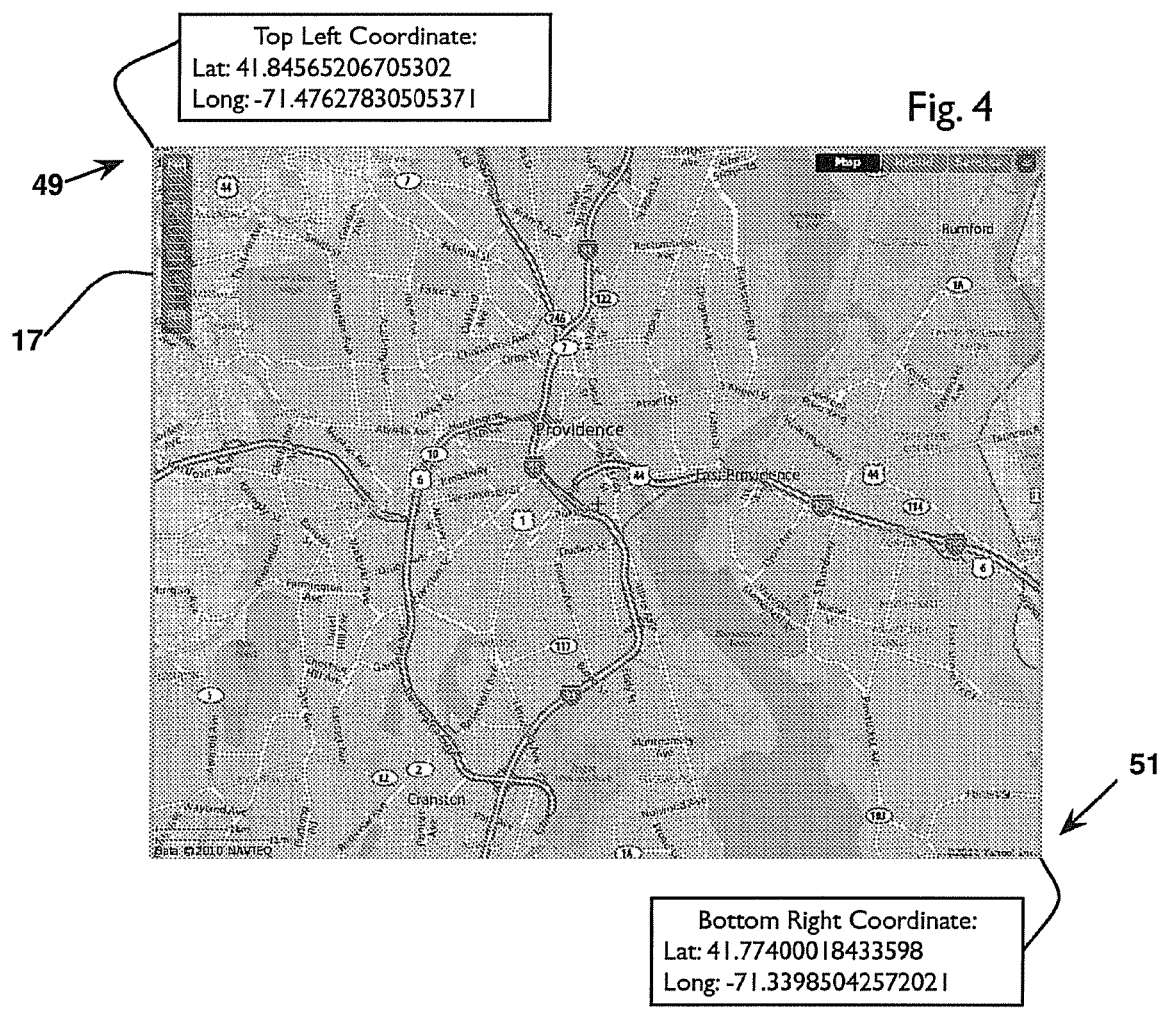
FIG. 4 illustrates an example geographical map illustrating a set of top left and bottom right latitude/longitude points in accordance with certain implementations of the present invention.

In the present embodiment, the geographic map display interface 13 uses a <div> container on a web page to embed the "Yahoo Maps™" service into the system 10, and thus display a geographic map having a viewable area. Other map service providers could alternatively be utilized, such as Google Maps™ or Bing Maps™, or any other map provider. A geographic map having a viewable area could also be served directly by the web application server 21. There are many examples of where a map service is embedded into a web page, such as to display the 'nearest store' locations of a business to a given user based on their postcode. The visual appearance of a geographic map having a viewable area is best illustrated in FIG. 4.

The computer system 10 also includes a map display change monitor 23. (A skilled person will appreciate that the word 'monitor' in this context does not refer to a computer display device.) The map display change monitor 23 provides the following functionality:

a) to receive a map change message in relation to a change in the viewable area of the geographic map, b) to obtain the geographic co-ordinates of the current viewable area of the geographic map, and c) to generate a display change notification, which may include the obtained geographic co-ordinates of the current viewable area of the geographic map.

Some or all of the three elements (a), (b) and (c) of functionality described above, as provided by the map display change monitor 23, may be implemented in part, or in whole, by a map service provider being utilized by the computer system 10, by processes separate from the map service provider, or directly by the web application server 21.

The map display change monitor 23 can be implemented in either the client-side executable code in Javascript, or in a combination of client-side executable code and server-side executable code. In the present embodiment, the map display change monitor 23 is implemented in the form of client-side Javascript code, to mimise the latency of the execution of the features. To facilitate this, in the present embodiment a widget using the Google Web Toolkit (GWT) is utilized. The Javascipt code could alternatively be in a different programming language, where that language or scripting language can be run in a web browser.

In the present embodiment, the step of receiving a map change message in relation to a change in the viewable area of the geographic map is achieved by registering with the Yahoo Maps API using the YEvent( ) class (YEvent( )#Capture). The map display change monitor 23 registers with the YEvent( )#Capture function to receive the "endPan" message. The map display change monitor 23 also registers to receive the YEvent( )#Capture "changeZoom" event. The "endPan" message is received whenever the user has panned or scrolled the geographic map, as a change has occurred in the viewable area of the geographic map. If the user 19 changes the zoom level, a change in the viewable area of the geographic map has also occurred. In this manner, the embodiment receives a map change message that the viewable area of the geographic map has changed. A skilled person will appreciate that the aforementioned API calls will vary by map provider, and that the exact event API class/name may change over time.

Upon receiving the "endPan" or "changeZoom" event from the Yahoo Maps API, the map display change monitor 23 obtains the geographic co-ordinates of the current viewable area of the geographic map. To achieve this, when the map change message is received, the #getBoundsLatLon method of the YMap object representing the map being manipulated by the user 19 is called, which in turn provides the top left and bottom right lat/lon points of the viewable map. The top left 49 and bottom right 51 lat/lon points define the viewable area of the geographic map. An example of such geographic co-ordinates is illustrated in FIG. 4.

Once the geographic co-ordinates of the current viewable area of the geographic map are obtained, the map display change monitor 23 generates a display change notification including the obtained geographic co-ordinates of the current viewable area of the geographic map, and notifies any objects that have registered with the map display change monitor 23 to be notified of the same. In the present embodiment, an information display generator 26 registers to receive the notifications from the map display change monitor 23. The information display generator 26 is described in further detail below.

As an alternative embodiment, the system may directly control and/or draw the geographic map. Under this alternative embodiment, the map display change monitor 23 receives and stores at least recent geographic co-ordinates of the current viewable area of the geographic map. Subsequently, the map display change monitor 23 compares the current geographic co-ordinates of the viewable map with the immediate previously stored geographic co-ordinates, and generates a display change notification when current geographic co-ordinates do not match immediate previously stored geographic co-ordinates. This alternative embodiment is implemented using in a poll driven process of checking the current co-ordinates, and if they have changed since last checked, generating the display change notification.

In a further alternative embodiment a display change notification may be generated by detecting when a user ceases to pan, scroll or zoom the geographic map. A short timed out period, or predefined time period, of one to three seconds, for example, may be in-built after the user ceases to pan, scroll or zoom the geographic map, before the display change notification is generated to avoid unrequired data processing that could needlessly tie up resources, particularly where the service is accessed by multiple users. It is envisaged that the timed out period would reset if within it, the user continues to pan scroll or zoom the geographic map, and it would commence again on the user ceasing to pan, scroll or zoom the geographic map, in order to avoid transient updating of the data, until the user had settled on the map view they required.

As an alternative to a timed out period, a display change notification may be generated following a user initiated command. A user command activator may be provided for this purpose. The user command activator may be an on screen button, i.e. an update the button. The update button may be presented to the user to allow them to manually trigger a display change notification. In this regard, the update button may be visible and/or highlighted only upon the user having panned, scrolled or zoomed the geographic map since the last time the update button was pressed.

Other ways of determining whether the map view has been changed by the user will be apparent to the skilled addressee.

Figure 5A:
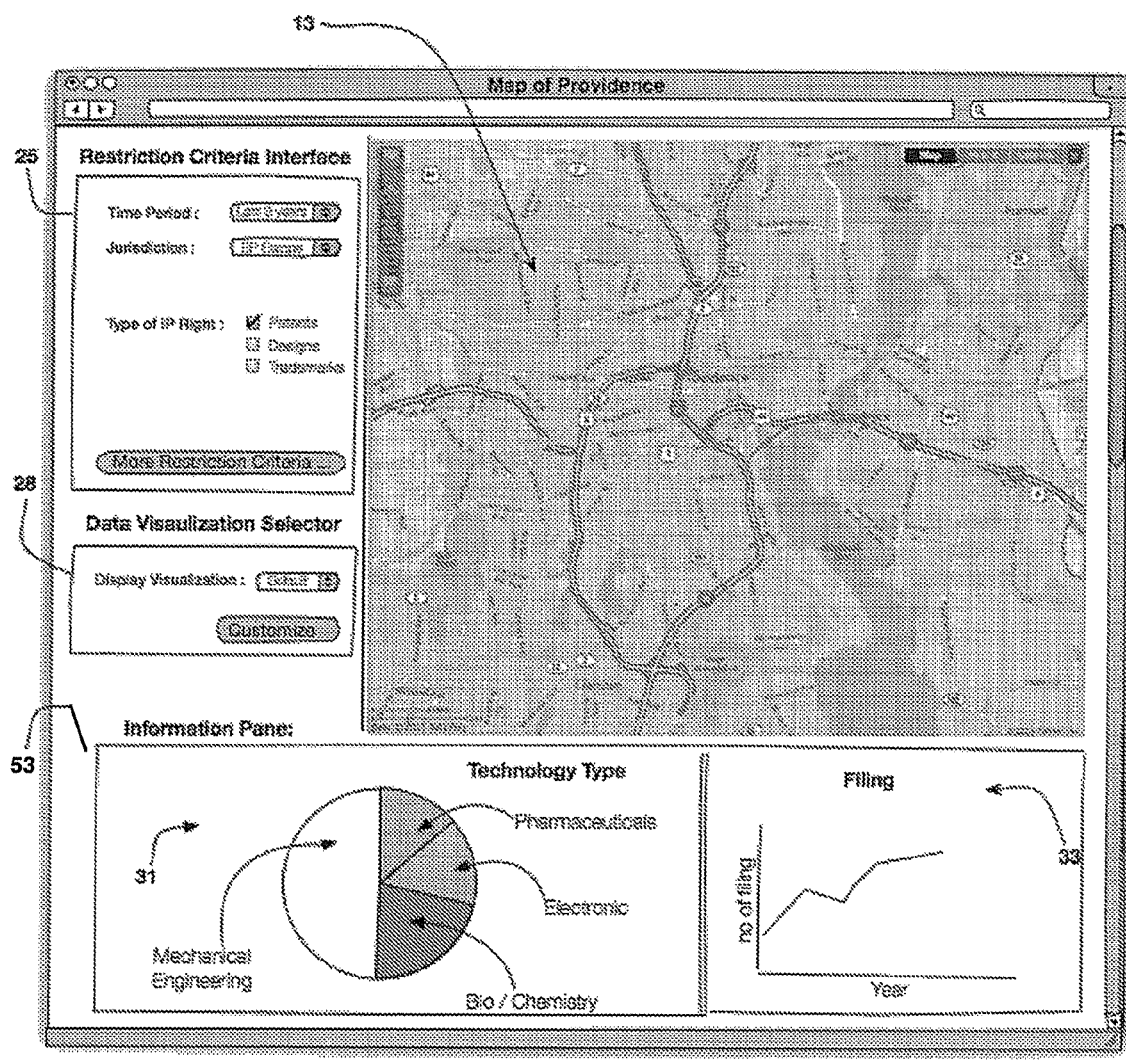
FIGS. 5a and 5b are a sequence of screenshots to illustrate example use of the present invention according to an aspect of the present invention.
Figure 5B:
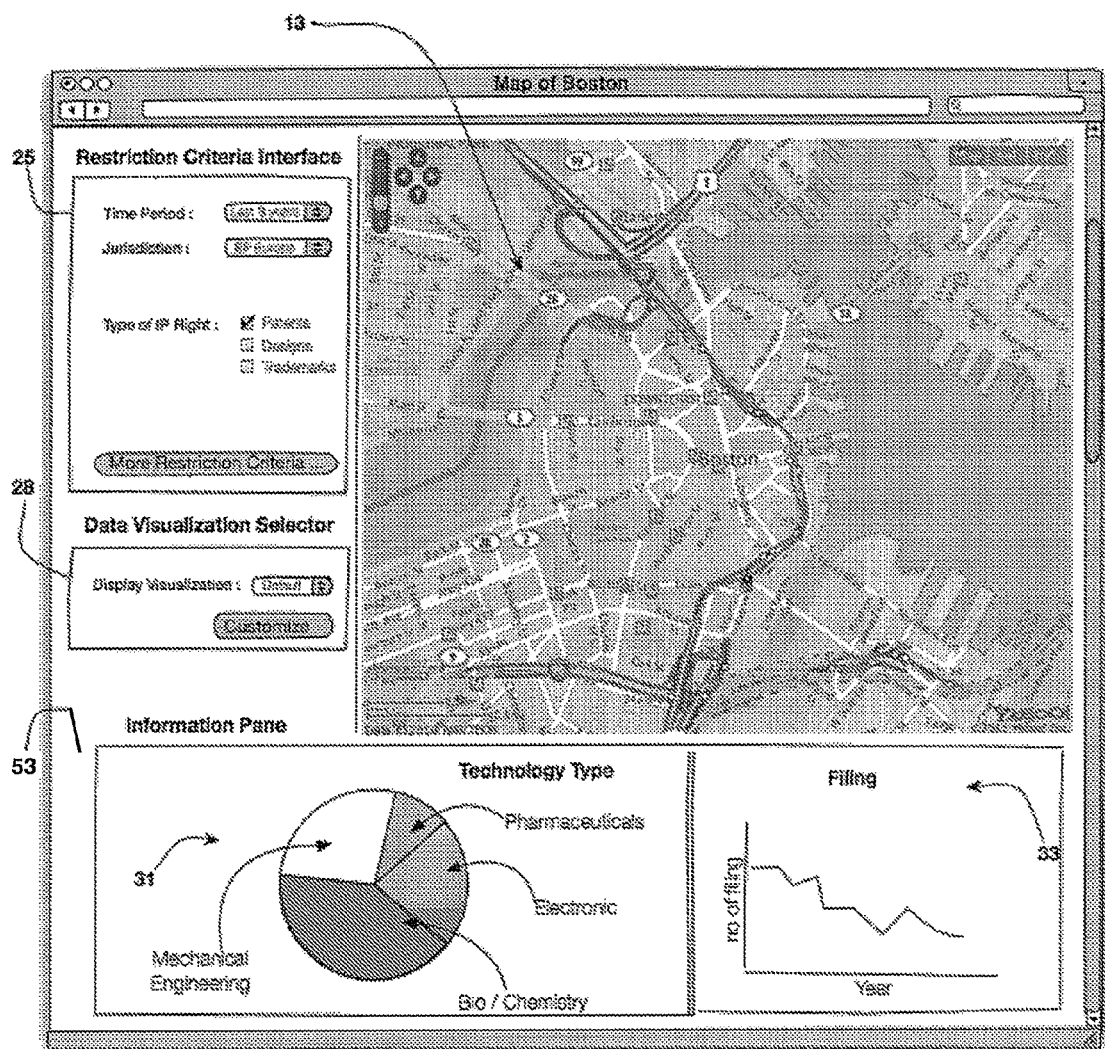

Returning to the preferred embodiment, a restriction criteria determination interface 25 is also provided, to ascertain one or more restriction criteria related to the IP rights contained in the database of IP rights 11. As one example, the user 19 may apply a restriction criteria related to a particular type or types of IP rights, restricting their data visualizations to patent IP rights only, or their restriction criteria could be to include only trademark and business name IP rights. An example restriction criteria determination interface 25 is illustrated in FIGS. 5a, 5b and FIG. 6.

Further examples of restriction criteria are as follows:

i) IP jurisdiction of the IP rights—a selection of one or more jurisdictions, for example, European IP rights & Japanese IP rights only.

ii) technology type—for example, IP rights relating to agricultural-related IP rights only;

iii) industry type—for example, IP rights relating to the pharmaceuticals industry only;

iv) filing date of the IP right—for example, IP rights filed within the previous 3 years only, or a specified date range;

v) numerical range of the number of applications that an IP right owner has filed—for example, only IP rights owners that have applied for at least 5 IP rights, and that have applied for no more than 50 IP rights;

vi) whether the IP right owner is an individual or a corporation;

vii) whether an attorney is listed as a representative for the IP right;

viii) patent IP rights that are classified in one or more defined IPC classes;

ix) trademark IP rights that are classified in a given number of classes of goods and/or services; and x) trademark IP rights classified in one or more defined classes of goods and/or services.

An example restriction criteria determination interface 25 is illustrated in FIG. 6.

The restriction criteria determination interface 25 may comprise a default setting of restriction criteria or one or more user-selected restriction criteria. For example, the restriction criteria determination interface 25 may default to showing only application filing dates within the last 3 years for performance reasons, but allowing the user to select different criteria as desired. This is illustrated in FIG. 5a.

The computer system 10 of the present embodiment also includes a data visualization selector 28, to allow the user to select one or more data visualizations based on the restriction criteria. An example data visualization selector 28 is illustrated in FIG. 7. The data visualizations are explained in more detail below.

The standard data visualization selector 28 offers the user 19 a "default" setting, which can then be determined based on the restriction criteria. For example, if the user 19 has selected a restriction criteria to only mining-related patents, a chart of industry would be inapplicable (it would always display 100% mining in the chart). A more detailed data visualization selector 28 provides a checkbox list of options to the user 19, which may include a chart of the types of technologies to which the IP rights relate 31; a chart of the types of industries to which the IP rights relate; a filing trend analysis chart for the IP rights 33; and an IP rights owner filing size chart. The data visualization selector 28 may also limit the list of options based on the current restriction criteria, by disabling some of them. Using the same example, if the user 19 had selected IP rights relating to mining-related IP rights only, using the restriction criteria determination interface 25, the data visualization selector 28 may not include any data visualizations relating to industries, as only mining-related IP rights would be considered.

A further data visualization relating to clustered peak overlays is discussed further below.

The computer system 10 includes an IP right list generator 37 that performs two primary functions:

a) generating a first list of IP rights from the database of IP rights at 1016, in which the geographic address of at least one owner of each IP right is within the geographic area defined by the current map co-ordinates of the current viewable area of the geographic map, and b) restricting the first list of IP rights based on said one or more restriction criteria related to the IP rights to form a restricted list of IP rights at 1018.

These two steps (a) and (b) of the IP right list generator 37 are described in detail below. When the IP right list generator 37 is requested to generate a restricted list of IP rights, it uses the obtained geographic co-ordinates of the current viewable area of the geographic map as the basis to firstly generate a first list of IP rights. As described above, a geographic area forming a rectangle is provided by the map display change monitor 23, in the form of the top left and bottom right lat/lon points of the viewable area of the geographical map. An example geographical map illustrating the top left and bottom right latitude/longitude points is provided in FIG. 4. In FIG. 4, the top left point 49 (Latitude: 41.84565206705302; Longitude: −71.47627830505371) and bottom right point 51 (Latitude: 41.77400018433598; Longitude: −71.33985042572021) are illustrated, in this example the city of Providence, R.I., USA is occupying the viewable area of the geographical map. In will be appreciated that these two points form a rectangular geographical area.

In order to explain how the IP right list generator 37 generates and restricts the list of IP rights, an abstract of relevant detail of a database structure for a database of IP rights 11 is provided. An entity relationship diagram is provided in FIG. 8. FIG. 8 illustrates the relationship between an IP Right entity 39 and an IP Right Owner entity 41, as well as their attributes. Importantly, as illustrated, the relationship between the two entities of the diagram is "many-to-many". That is, an IP Right Owner can own many IP Rights, and an IP Right can be owned by many IP Rights Owners. It will be appreciated that there may be more (or less) attributes for an IP Right entity 39 and IP Right Owner entity 41 in a given database.

A required attribute of each IP Right Owner entity 41 is a latitude co-ordinate 43 and a longitude co-ordinate 45. The latitude co-ordinate 43 and longitude co-ordinate 45 fields of each record of the IP Owner entity 41 table may be populated using a geo-encoding service, based on the address attribute 47.

The reader is now returned to the primary function (a) of the IP right list generator 37, which is to generate a first list of IP rights from the database of IP rights at 1016 for which the geographic address of at least one owner of each IP right is within the geographic area defined by the current map co-ordinates.

The IP right list is generated using the pseudo SQL statement of SELECT IP_RIGHT WHERE an IP_RIGHT_OWNER HAS (a latitude co-ordinate attribute 43 within the latitude co-ordinate of the top left point 49 and the latitude co-ordinate of the bottom right point 51) AND (a longitude co-ordinate attribute 45 within the longitude co-ordinate of the top left point 49 and the longitude co-ordinate of the bottom right point 51).

The query produces a list of those IP rights where an IP owner is located within the displayed map of FIG. 5*a*, which encompasses the Providence city and surrounding areas.

The IP right list generator 37 also includes primary function (b), which restricts the first list of IP rights based on said one or more restriction criteria related to the IP rights to form a restricted list of IP rights at 1018. In the present embodiment, this functionality is achieved by applying further restrictions the query made to the database of IP rights 11. For example, if the restriction criteria included a restriction only IP rights relating to patents only, then the query would be limited to WHERE IP_RIGHT.type=PATENT. As a further example, a if the restrictions were limited to pharmaceutical patents, then an additional query restriction would be applied, such as WHERE IP_RIGHT.ipc_code IN (<list of IPC codes relating to pharmaceutical patents>), or a single specific IPC code could be used.

The result from the IP right list generator 37 is a list of IP rights having an owner located within the geographic area defined by the current map co-ordinates of the viewable area of the displayed map, according to the restriction criteria.

The system includes an information display generator 26, to generate and display an information pane 53 containing one or more data visualizations based on the restricted list of IP rights.

As mentioned above, the information display generator 26 registers with the map display change monitor 23 to receive display change notifications. During the computer system's IO operation, the information display generator 26, upon receiving each successive display change notification, generates or updates each data visualization displayed in the information pane 53, based on the geographic co-ordinates of the current viewable area of the geographic display. This is achieved by the information display generator 26 obtaining the latest restricted list of IP rights from IP rights list generator 37 using the geographic co-ordinates contained in the display change notification.

This is achieved by requesting from the web application server 21 the data required by the data visualization, and then plotting the visualization in the information pane 53 using the data that is returned by the web application server 21. It would be appreciated by the skilled addressee how ajax is used to retrieve updated data from a server, upon a function being called from the client-side javascript. The present invention uses the Google™ Window Toolkit framework, to implement ajax communications between the web application server 21 and the user's web browser. Any suitable framework, such as DWR, or manually processing the ajax events, could alternatively be used. As is known, a database can be queried via the Java JDBC library, to retrieve data from a database, using the SQL query language. The information display generator 23 may form the data returned to the client-side Javascript in an XML or JSON format, making it more straightforward to plot the data visualizations onto the user's 19 computer display.

It will be appreciated that there is a linear relationship between the physical area that the current viewable area of the geographic map represents, and the amount of computer resources require to plot the visualization in the information pane 53. A further feature is thereby provided, whereby the map display change monitor disables generating a display change notification if the viewable area is larger than a maximum allowable size. This could, for example, be any zoom level integer below a given threshold. A message may be presented to the user, notifying them that the display pane is not accessible for the current zoom level, and request that the user zooms the map, in order for the display pane to become available again.

The methods to implement a data visualization using XML or JSON formatted data will be appreciated by the skilled addressee. For beautifully presented charts, a commercial charting tool may be employed. For example, one example of displaying a chart with the underlying data able to be updated periodically is Google™ Chart Tools <http://code.google.com/apis/chart/>. Other examples include JFreeChart and FusionCharts. Alternatively, HTML5, a web standard supported by the majority of web browsers, enables animations to be rendered directly within the browser, such as a moving line chart. There are also other alternatives, such as the Adobe™ Flash plug-in architecture.

It will be appreciated that the client-side code is sent by the server the user's 19 web browser in the form of HTML or variants thereof, where that executable code referenced in the HTML may be subsequently run. The executed code can be run as a combination between the client-side and the server. Consideration of the balance between these two methods of operation should include an analysis of the amount of data that needs to be transferred, and the amount of processing power required to transform the data into a format that is suitable for the data visualizations. It will invariably encompass a mix of client and server-side processing in this respect.

The following example of the described computer system 10 is provided as follows, with reference again to FIGS. 5*a* and 5*b*. The user 19 uses the restriction criteria determination interface 25 to provide the restriction criteria that they are interested in patent IP rights only, with an application filing date in the last 3 years, and patents that were filed in the European EP jurisdiction. The user 19 uses the geographic map display interface 13 to define their geographic area of interest (i.e. by setting the viewable area of the map to that geographic area of interest), as shown in FIG. 5*a*.

The user 19 may use the data visualization selector 28 to select a chart of types of industry, and a filing trend analysis chart 33, as shown in FIG. 7, or they may elect for the default selections to be displayed, as show in FIG. 5*a*-*b*.

After the user pans/scrolls the viewable map from Providence (RI) in FIG. 5*a* to largely encompass Boston (MA) in FIG. 5*b*, a display change notification generated by the map display change monitor 23. The information display generator 26 receives the display change notification and updates the data visualizations in the information pane 53. The update for the type of industry chart data visualization involves collating and/or aggregating the attribute of the IPC class codes, and then creating aggregate numbers for each technology type, to be displayed in a pie chart. The filing trend analysis chart using the filing date attribute of the IP right, to plot the number of applications filed over time.

It can be seen in FIG. 5*b*, that a greater percentage of IP Rights Owners in the Boston area that file European patents are in the technology area of Bio/Chemistry, whereas Providence area is more focused on Mechanical Engineering related patents.

The computer system 10 iterates repetitively as follows:
 receiving a map change message in relation to a change in the viewable area of the geographic map at 1012;
 obtaining the geographic co-ordinates of the current viewable area of the geographic map (e.g. the map co-ordinates of the viewable Providence city area) at 1014,
 generating a list of IP rights, from the database, in which the geographic address of at least one owner of each IP right is within the geographic area defined by the geographic co-ordinates of the current viewable area of the geographic map, (e.g. IP rights where at least one owner is located in the viewable Providence city area) at 1016, restricting the list of IP rights based on one or more restriction criteria related to the IP rights to form a restricted list of IP rights (e.g. further restrict IP Rights to only those that are Japanese trademarks, and trademarks having an application date within the last 3 years within today's date) at 1018, generating and displaying an information pane 53 containing one or more data visualizations related to the restricted list of IP rights at 1020, and generating or updating each data visualization displayed in the information pane 53 based on each set of successively obtained geographic co-ordinates of the current viewable area of the geographic map (e.g. display the chart of type of industry using the class information based on the restricted list of IP rights) at 1022.

Another data visualization is the presentation of a map that displays a cluster of the restricted list of IP rights based on the postcode of the address of each owner of the IP rights in the list. That is, the pseudo SQL statement would include a SUM (IP_RIGHT) and GROUP BY IP_RIGHT_OWNER.POSTCODE statement, to facilitate the display of the cluster of the restricted IP rights list. This data visualization displays an overlay onto the viewable area of the displayed map itself. It displays peaks over the geographical area corresponding to each postcode. The heights of the peaks represent the number of IP rights within the respective postcodes.

While the invention has been described with reference to an exemplary embodiment thereof, those skilled in the art will be able to make various modifications to the described embodiments, in the light of common general knowledge, without departing from the true spirit and scope. The terms and descriptions used herein are set forth by way of illustration only and are not meant as limitations. In particular, although the system and process have been described by way of examples, the steps of the process may be performed in a different order than illustrated, or simultaneously. Those skilled in the art will recognize that these and other variations are possible, in the light of common general knowledge, within the spirit and scope as defined in the claims and their equivalents.

The invention claimed is:

1. A data processing system to visualise data from an IP rights database comprising:
   a geographic map display interface to display a geographic map having a viewable area;
   a map display change monitor to:
      receive and store at least recent geographic co-ordinates of the viewable area of the geographic map,
      compare current geographic co-ordinates with immediate previously stored geographic co-ordinates, and
      generate a display change notification when the current geographic co-ordinates do not match immediate previously stored geographic co-ordinates, wherein the map display change monitor generates the display change notification after a pre-defined time period elapses and there has been no change in the viewable area of the geographic map;
   a restriction criteria interface to ascertain one or more restriction criteria related to the IP rights;
   an IP rights list generator to
      generate a list of IP rights, from the IP rights database, in which a geographic address of at least one owner of each IP right is within a geographic area defined by geographic co-ordinates of the current viewable area of the geographic map, and
      restrict the list of IP rights based on one or more restriction criteria related to the IP rights to form a restricted list of IP rights; and
   an information display generator to generate and display an information pane containing one or more data visualizations derived from the restricted list of IP rights;
   wherein, in use, upon receiving each successive display change notification, the information display generator generates or updates each data visualization displayed in the information pane.

2. A system according to claim 1, wherein the map display change monitor stores the geographic co-ordinates of the viewable area of the geographic map for an entire session, or multiple sessions, to thereby provide a user history of use of the system.

3. A system according to claim1, wherein the one or more restriction criteria comprises a default setting of restriction criteria, or one or more user-selectable restriction criteria.

4. A system according to claim1, wherein the restriction criteria include at least one criterion from the following group: IP jurisdiction of the IP rights; type of IP right; technology type; industry type; filing date of the IP right; the number of applications for IP rights that an IP right owner has filed; whether the IP right owner is an individual or a corporation; whether a representative is listed for the IP right; patent IP rights that are classified in one or more defined IPC classes; trademark IP rights that are classified in a given number of classes; and trademark IP rights classified in one or more defined classes.

5. A system according to claim 1, wherein the one or more data visualizations comprise
   a default setting of data visualizations based on a default setting of the restriction criteria, or
   user-selectable data visualizations based on the restriction criteria.

6. A system according to claim 1, wherein it further comprises a data visualization selector to allow the user to select one or more data visualizations based on the restriction criteria.

7. A system according to claim 1, wherein the data visualizations include at least one data visualization from the following group: a chart of the types of technology to which the IP rights relate; a chart of the types of industries to which the IP rights relate; a filing trend analysis chart for the IP rights; an IP rights owner filing size chart.

8. A computer system to visualise data from an IP rights database comprising:
   a geographic map display interface to display a geographic map having a viewable area;
   a map display change monitor to:
      receive a map change message in relation to a change in the viewable area of the geographic map,
      obtain geographic co-ordinates of a current viewable area of the geographic map, and
      generate a display change notification including the geographic co-ordinates of the current viewable area of the geographic map, wherein the display change notification is generated after a pre-defined time period elapses and there has been no change in the viewable area of the geographic map;
   a restriction criteria interface to ascertain one or more restriction criteria related to the IP rights;
   an IP rights list generator to
      generate a list of IP rights, from the IP rights database, in which a geographic address of at least one owner of each IP right is within a geographic area defined by geographic co-ordinates of the current viewable area of the geographic map, and restrict the list of IP rights based on one or more restriction criteria related to the IP rights to form a restricted list of IP rights; and an information display generator to generate and display an information pane containing one or more data visualizations derived from the restricted list of IP rights;

wherein, in use, upon receiving each successive display change notification, the information display generator generates or updates each data visualization displayed in the information pane based on the geographic co-ordinates of the current viewable area of the geographic map display corresponding to each successive display change notification.

9. A process for visualizing data from an IP rights database comprising:

receiving a map change message in relation to a change in a viewable area of the geographic map, the map change message being generated after a pre-defined time period elapses and there has been no change in the viewable area of the geographic map, obtaining geographic co-ordinates of a current viewable area of the geographic map display, generating a list of IP rights, from the IP rights database, in which a geographic address of at least one owner of each IP right is within a geographic area defined by the geographic co-ordinates of the current viewable area of the geographic map display, restricting the list of IP rights based on one or more restriction criteria related to the IP rights to form a restricted list of IP rights, generating and displaying an information pane containing one or more data visualizations related to the restricted list of IP rights, and generating or updating each data visualization displayed in the information pane based on each set of successively obtained geographic co-ordinates of the current viewable area of the geographic map display.

10. A process for visualizing data from an IP rights database comprising:

monitoring and storing at least recent geographic co-ordinates of a viewable area of a geographic map and issuing a display change notification on detecting a change in the viewable area of the geographic map the display change notification being generated after a pre-defined time period elapses and there has been no change in the viewable area of the geographic map, generating a list of IP rights, from the IP rights database, in which a geographic address of at least one owner of each IP right is within a geographic area defined by geographic co-ordinates of a current viewable area of the geographic map display, restricting the list of IP rights based on one or more restriction criteria related to the IP rights to form a restricted list of IP rights, generating and displaying an information pane containing one or more data visualizations related to the restricted list of IP rights, and generating or updating each data visualization displayed in the information pane based on each set of successively obtained geographic co-ordinates of the current viewable area of the geographic map display.

11. A process according to claim 10, wherein the one or more restriction criteria comprises a default setting of one or more restriction criteria, or one or more user-selectable restriction criteria.

12. A process according to claim 10, wherein the restriction criteria include at least one criterion from the following group: IP jurisdiction of the IP rights; type of IP right; technology type; industry type; filing date of the IP right; the number of applications for IP rights that an IP right owner has filed or owns; whether the IP right owner is an individual or a corporation; whether a representative is listed for the IP right; patent IP rights that are classified in one or more defined IPC classes; trademark IP rights that are classified in a given number of classes; and trademark IP rights classified in one or more defined classes.

13. A process according to claim 10, wherein the one or more data visualizations comprise a default setting of data visualizations based on a default setting of the restriction criteria, or user-selectable data visualizations based on the restriction criteria.

14. A process according to claim 10, wherein the data visualizations include at least one data visualization from the following group: a chart of the types of technology to which the IP rights relate; a chart of the types of industries to which the IP rights relate; a filing trend analysis chart for the IP rights; an IP rights owner filing size chart; and, a list of IP rights owners.

15. A process according to claim 10, wherein generating or updating each data visualization displayed in the information pane based on each set of successively obtained geographic coordinates of the current viewable area of the geographic map display occurs after a pre-defined time period elapses and there has been no change in the viewable area of the geographic map.

16. A process according to claim 10, wherein generating or updating each data visualization displayed in the information pane based on each set of successively obtained geographic coordinates of the current viewable area of the geographic map display occurs following a user initiated command.

17. A process according to claim 16, wherein the user initiated command comprises the pressing of an on-screen button.

* * * * *